Figure 1:
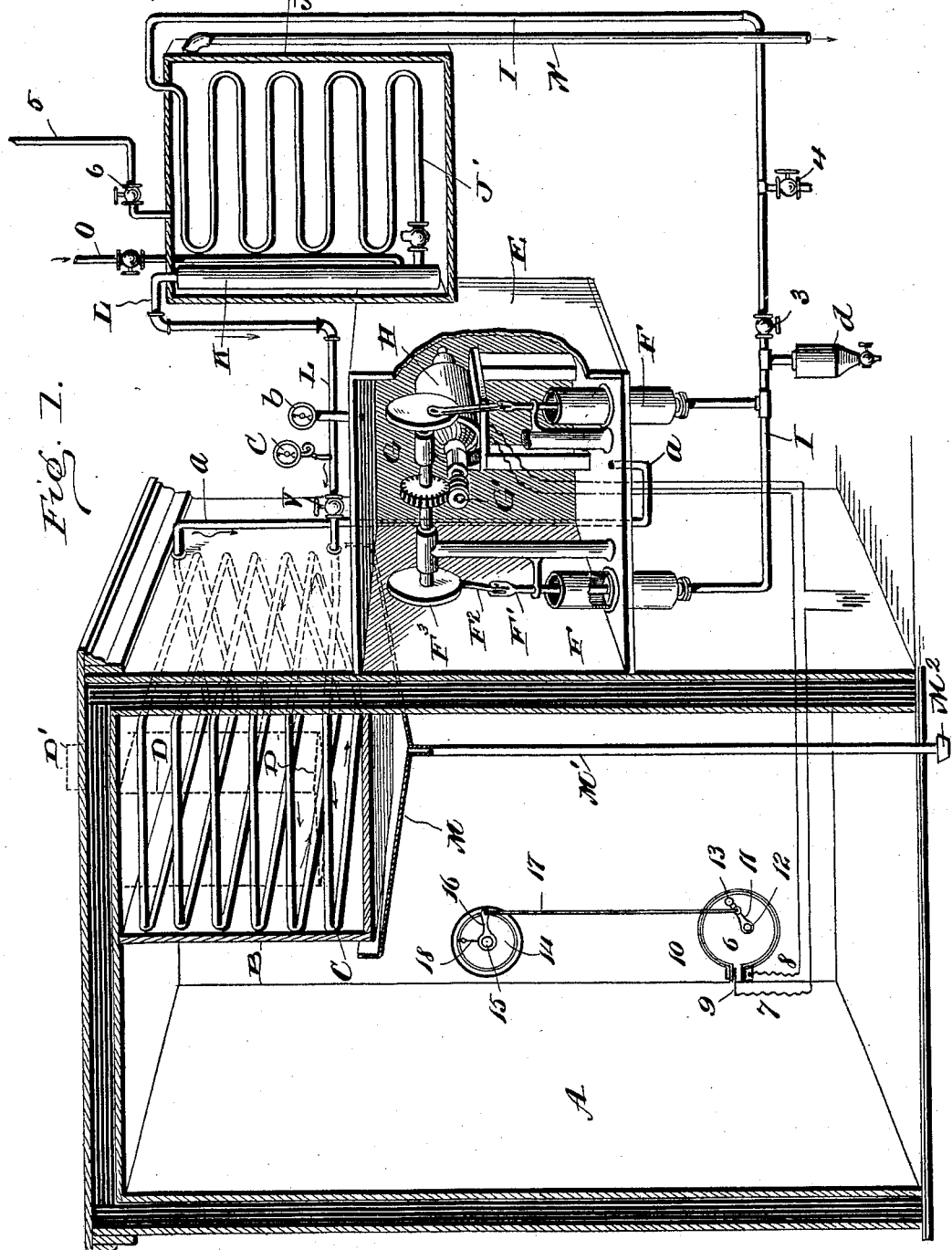

(No Model.) 2 Sheets—Sheet 2.
W. F. SINGER.
REFRIGERATING APPARATUS.
No. 577,328. Patented Feb. 16, 1897.
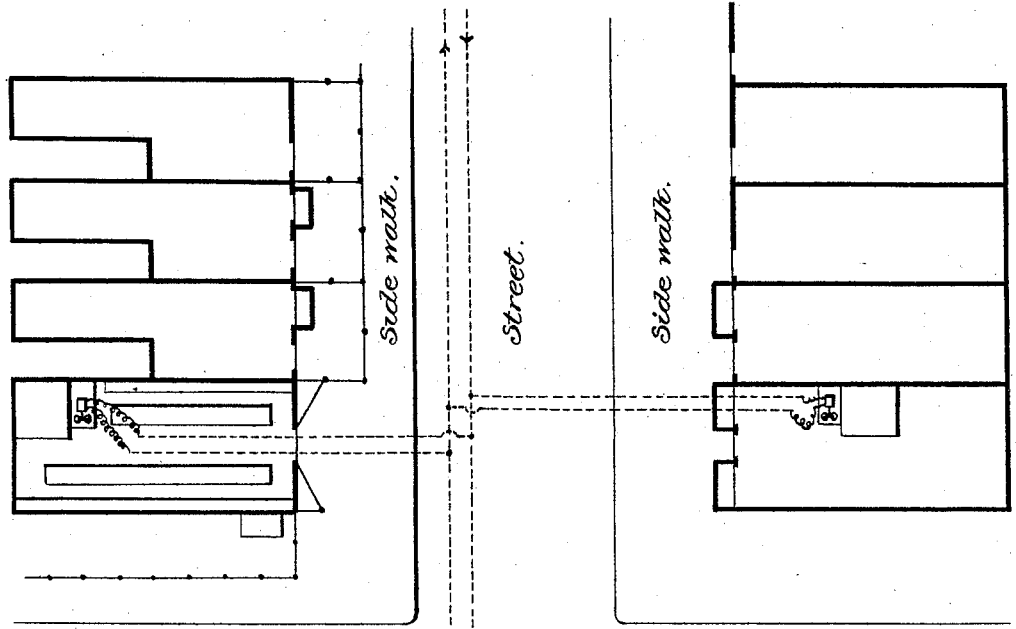
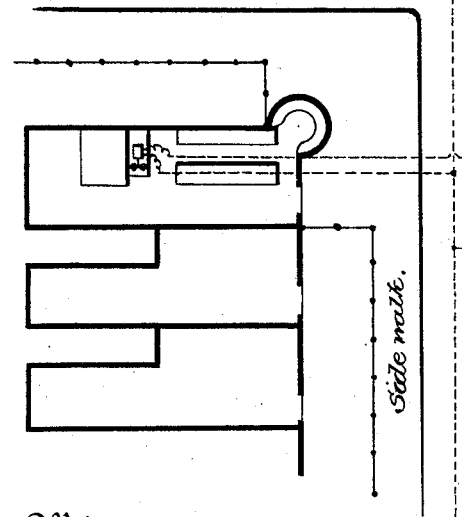
Fig. 2.
Witnesses
L. C. Hills
A. L. Hough
Inventor
William F. Singer,
by Franklin H. Hough
Attorney

UNITED STATES PATENT OFFICE.

WILLIAM F. SINGER, OF NEW YORK, N. Y., ASSIGNOR TO THE AMERICAN ELECTRIC COLD-SUPPLY COMPANY, OF MAINE.

REFRIGERATING APPARATUS.

SPECIFICATION forming part of Letters Patent No. 577,328, dated February 16, 1897.

Application filed April 20, 1896. Renewed January 23, 1897. Serial No. 620,490. (No model.)

*To all whom it may concern:*

Be it known that I, WILLIAM F. SINGER, a citizen of the United States, residing at New York city, in the county of New York and State of New York, have invented certain new and useful Improvements in Systems of Refrigeration; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in refrigerating apparatus of the character which depends upon the expansion in volume of a volatile agent or refrigerating-gas, such as carbonic-acid gas or other well-known refrigerant, to produce the required degree of temperature.

The apparatus, which will hereinafter be described and which constitutes my invention, is of a character adapted for use in domestic and other refrigeration, the apparatus being especially designed and adapted for use as a complete refrigerating and ice-making plant for use in a house, store, or other building, and also for use in a connected series, said series of machines being connected with any suitable source of electrical supply.

A further object of the present invention resides in the provision of a simple and inexpensive apparatus for refrigerating and ice-making purposes, which will have a complete and independent refrigerating circulation, including a pump and an electric motor, both of which are inclosed within a hermetically-sealed case, and including also expansion and condensing coils or chambers in proximity to the refrigerating-chamber of the refrigerator, and electric connection with a source of electric energy, whereby the motor is operated without any moving parts penetrating the hermetically-sealed case. Said source of electric energy may be a circuit within which are included several independent or separate refrigerators, or may be a separate and independent source adapted to supply the current to an individual apparatus, as will be at once evident in view of the fact that each apparatus, when electrically connected, constitutes within itself a complete and operative refrigerating plant, including a thermostatic regulator, whereby the temperature of the interior of the refrigerator is made to automatically control the supply of current to the motor.

To these ends and to such others as the invention may pertain the same consists in the peculiarities of construction and in the novel features and novel combination, arrangement, and adaptation of parts, all as more fully hereinafter described, shown in the accompanying drawings, and then specifically defined in the appended claims.

The invention is clearly illustrated in the accompanying drawings, which, with the letters and figures of reference marked thereon, form a part of this specification, and in which drawings—

Figure 1 is a vertical longitudinal section of a refrigerating apparatus embodying my invention. Fig. 2 is a diagrammatic view in which is shown a series of refrigerators in circuit.

Reference now being had to the details of the drawings by letter, A designates a refrigerator or cold-storage apartment, which may be of any of the well-known constructions, such as are in common use. Located within a compartment B, in the upper part of the refrigerator, is an expansion-coil C, the pipes in which coil surround an ice mold or tank D, the said tank or mold extended through the top of the refrigerator-case and provided with a cap or cover D'.

Upon the outside of the refrigerator A and adjacent thereto is placed a hermetically-sealed chamber E, within which chamber are located two pumps, the barrels of the said pumps in the present instance being shown as extending through the bottom of the chamber, the aperture in the bottom or floor through which they pass being hermetically sealed. These pumps F are in all respects similar in construction to pumps in common use, the piston-head or plunger being provided with the usual opening and hinged or "flap" valve, which is adapted to open automatically upon the upstroke of the piston and to close over the opening in the piston-head when the piston is forced downward. This construction of piston-head being common in pumps of this character, a detailed illustration and description of the same in this connection are deemed to be unnecessary. The piston-rods F' of the pumps are at their upper ends connected to the pitman-rods F², which in turn are attached in the usual manner by wrist-pins to the disks F³, the shaft upon which said disks F³ are carried being provided with a gear-wheel G, which meshes with a worm-gear upon the shaft G' of an electrical motor H, the said motor being placed upon a suitable support rising from the floor of the chamber.

The pipe a, connecting the chamber E with the expansion-coil C, enters the chamber E through the floor of the chamber, as shown.

The discharge ends of the pumps F F have pipe connection with a common pipe I, which pipe I leads to the upper part of a condensing-tank J, which tank is filled with water in contact with the condenser-coil J', which coil at its lower end connects with the lower end of the receptacle K, which is adapted to contain the refrigerant when compressed into liquid form. This receptacle K extends from the top to the bottom of the tank J, and at its upper end is provided with a pipe L, which connects directly with the expansion-coil C within the compartment or tank in the refrigerator.

The tank or compartment B is constructed, preferably, of sheet metal and is filled with salt water. Ordinarily, though, when it is desired to secure a temperature below the freezing-point of salt brine a brine made of chlorid of calcium in solution is substituted for the salt brine.

In order to provide for the carrying off of water resulting from the melting of frost upon the outside of the tank B when for any reason the operation of the device is suspended for a protracted period, I provide beneath the tank a drip-pan M, having a waste-pipe M', which leads downward through the bottom of the refrigerator and at its lower end is provided with a water seal M² to prevent the escape of cold air from the refrigerator.

To indicate the degree of pressure within the hermetically-sealed chamber E, a suitable gage b is provided, and a gage c is provided in connection with the pipe L, connecting the receptacle K with the expansion-coil in the refrigerator, the said gage serving to indicate the degree of pressure of the liquefied refrigerant.

The pipe I, which connects the discharge ends of the pumps F with the condensing-coil, is provided with a suitable oil-trap d, which serves to prevent the waste oil used in lubricating the pumps from passing into the condensing-coils with the refrigerating-gas.

The tank J, surrounding the condensing-coil, is provided with a suitable overflow or waste pipe N, which communicates with the tank near its top, and the liquid-refrigerant receptacle K is provided with a suitable filling-tube O, which connects with the receptacle at a point near its lower end.

At intervals throughout the pipe system of the apparatus suitable valves are provided, which will be hereinafter referred to and their use defined in connection with the description of the operation of the device.

In a system of the kind described it is necessary at some point to control the motive power or to provide means whereby it may be controlled by a skilled person having charge of the system. This is necessary as well to maintain the proper amount of refrigeration as to prevent any waste of energy. For this purpose of automatically regulating the motor H, I provide a thermostat 6, which is located upon one of the walls of the interior of the refrigerator. This thermostat may be of any of the well-known constructions which may be found to be adapted to the purpose. In the present instance, however, I have shown a thermostat consisting of two strips of metal, one of the strips being of steel, the other of brass. These strips are bolted or otherwise secured together through their entire length and are bent in the arc of a circle with the steel strip on the inside. To one end of the strips thus united is connected a wire 7, which extends to one pole of the dynamo or battery, and from the opposite ends of the strips a wire 8 extends to the motor, thence through the motor to the other pole of the battery or dynamo, and thence from the battery to the strip 9, carrying at its free end contact-points 10, as shown.

11 is a lever secured at one of its ends to a bolt 12, located at one side of the center of the thermostat 6. The said lever 11, secured at its free end to a rubber block 13, is adapted to, upon the movement of the said lever, contact with the inner face of the coiled metal strips of the thermostat, and thus expand the diameter of the same or allow the same to contract, as the case may be, thus regulating the distance between the free ends of the same, as will be readily understood.

Located upon the outside of the refrigerator-case, at a point directly above the plane upon which the thermostat is placed, is an indicating-dial 14. Upon the inner end of the shaft 15, connecting the center of the dial with the interior of the refrigerator, is an arm or lever 16, connected by a rod or wire 17 with the arm 11 of the thermostat, and upon the other face of the dial on the shaft 15 is an indicating-pointer 18.

So equipped a series of independent refrigerators of any desired size may be located at various points in dwelling-houses or in shops requiring refrigeration, and all or any number may be connected to a common line, as X, which is in communication with any suitable source of electrical energy.

In operation, supposing that the machine has been charged by filling the liquid-gas receptacle K with a volatile liquefied gas, the expansion-valve V is first slightly opened and the liquefied gas is allowed to expand into the expansion-coil C, thereby producing an intense cold. The receptacle K, containing the liquefied refrigerant, is placed within the condensing-tank for the purpose of holding said refrigerant at a nearly-uniform temperature at all times, so as to prevent changes in pressure which would otherwise be caused by fluctuations in temperature of the atmosphere. The gas passes from the coil C by means of the pipe $a$ through the bottom plate of the hermetically-sealed chamber E, thus entering the said chamber at its bottom. The gas is allowed to thus flow into the chamber until a pressure of from six to ten pounds per square inch has accumulated. The pumps F F are then put in operation by means of the motor H, exhausting a sufficient amount of the gas to maintain a pressure at all times during the operation of the pumps of from six to ten pounds within the chamber. The gas removed from the chamber by the action of the pumps is forced into the common pipe I, thence through said pipe I into the condensing-coil J', where it is cooled by the water surrounding the coil and compressed by the action of the pumps to a liquid, which enters the receptacle K, from which it again passes into the expansion-coil, thus completing the cycle. The volatile refrigerant, at the moment of entering the hermetically-sealed chamber E, possesses a temperature below zero, Fahrenheit. Therefore its cooling effect upon the motor, the pumps, and the other working parts contained within said chamber and constantly while running subjected to said cooling influence is exceedingly beneficial in several ways. For example, all electric motors operating under ordinary conditions generate and tend to accumulate heat; also pump-plungers and running journals generate more or less heat from friction, and in both cases the result is a considerable lowering of efficiency. It will be seen that this gas, filling the hermetically-sealed chamber and entering it chilled to the extremely-low temperature mentioned, will take up and carry away the heat so generated by the operation of the mechanism, maintain the efficiency of the motor, and prevent wear of the other moving parts. Also this cooling effect largely offsets and neutralizes the heat evolved in the process of compressing the refrigerating-gas, and results in said gas again entering the condensing-coil at a much lower temperature than would otherwise be possible.

The hermetically-sealed chamber serves another important purpose by preventing the escape of any portion of the usually pungent and offensive refrigerating-gas, which would otherwise, in spite of all precautions and after some wear of the parts, leak through the stuffing-boxes and the pumps, such leakage becoming worse with additional wear and requiring constant attention and expense. Said sealed chamber further serves to protect the whole working mechanism from atmospheric influences, from accident, and from interference by unauthorized persons, thus tending to assure the entirely automatic and regular operation of the refrigerating system of which it forms a part.

The valve 3 is designed to be closed in order to prevent the gas from escaping from the condenser-coils when the pumps are taken apart for examination or repairs. The valve 4 is provided for the purpose of permitting the pumps within the hermetically-sealed chamber to discharge or free the system of air before gas is introduced into the system. The valve 6, which is located in the pipe 5, which pipe is provided as a means of conducting the cooling water-supply to the condensing-tank J, is used for regulating the water-supply, as will be readily understood.

It is further intended that, when preferred, two or more refrigerators may be cooled by the agency of one set of moving machinery, to wit, one pair of pumps and an electric motor operating the same, both pumps and motor being inclosed in one hermetically-sealed chamber, but serving, by means of a proper duplication of expansion and condensing coils and other connected parts, to condense and circulate the gaseous refrigerant for and through two or more associated refrigerators or apartments.

My invention is designed to be used not only for the ordinary and well-known purposes of refrigerating provision or storage chambers containing commodities and making ice artificially, but also for the purpose of artificially cooling the atmosphere in railway passenger-cars, in ships, and in living-rooms and working-rooms of residences and other buildings occupied by human beings.

Modifications in construction required to adapt the invention to specific purposes will be made the subject of applications to be hereafter filed.

Having thus described my invention, what I claim to be new, and desire to secure by Letters Patent, is—

1. In a refrigerating apparatus, a hermetically-sealed chamber, the gas-return pipe from the expansion-coil leading to the chamber and the gas-pump and its motor located in the chamber.

2. In a refrigerating apparatus, a hermetically-sealed chamber, the gas-return pipe leading to and opening freely into said chamber, and the gas-pump and its motor located in the chamber.

3. In a refrigerating apparatus, a hermetically-sealed chamber, the gas-return pipe from the expansion-coil leading to the chamber, and the gas-pump and electric motor located in said chamber, and supply-wires passing gas-tight through the chamber-wall.

4. A refrigerator, an expansion-coil therein, an adjacent hermetically-sealed chamber connected to the expansion-coil, and the gas-pump and its motor in said chamber, and delivering its gas outside thereof.

5. A refrigerator, an expansion-coil therein, a hermetically-sealed chamber mounted on the wall of the refrigerator, and connected to the expansion-coil, and the gas-pump and its motor located in said chamber and delivering the gas outside thereof.

6. A refrigerator, an expansion-coil therein, an adjacent hermetically-sealed chamber connected to the expansion-coil, and the gas-pump and its motor in said chamber, and the condenser connected to the pump and pipe leading from the condenser to the expansion-coil.

7. In a refrigerating apparatus, a hermetically-sealed chamber the walls of which are free from penetration by any moving part, the gas-return pipe from the expansion-coil leading to the chamber, and the gas-pump and electric motor located in said chamber, and supply-wires passing gas-tight through the chamber-wall.

In testimony whereof I affix my signature in presence of two witnesses.

WILLIAM F. SINGER.

Witnesses:
 WILLIAM L. VAN LOAN,
 FRANKLIN H. HOUGH.